S. B. NEWBERRY & G. R. FISHBURNE.
PROCESS OF MAKING FERTILIZER.
APPLICATION FILED MAR. 30, 1910.
1,194,219.
Patented Aug. 8, 1916.
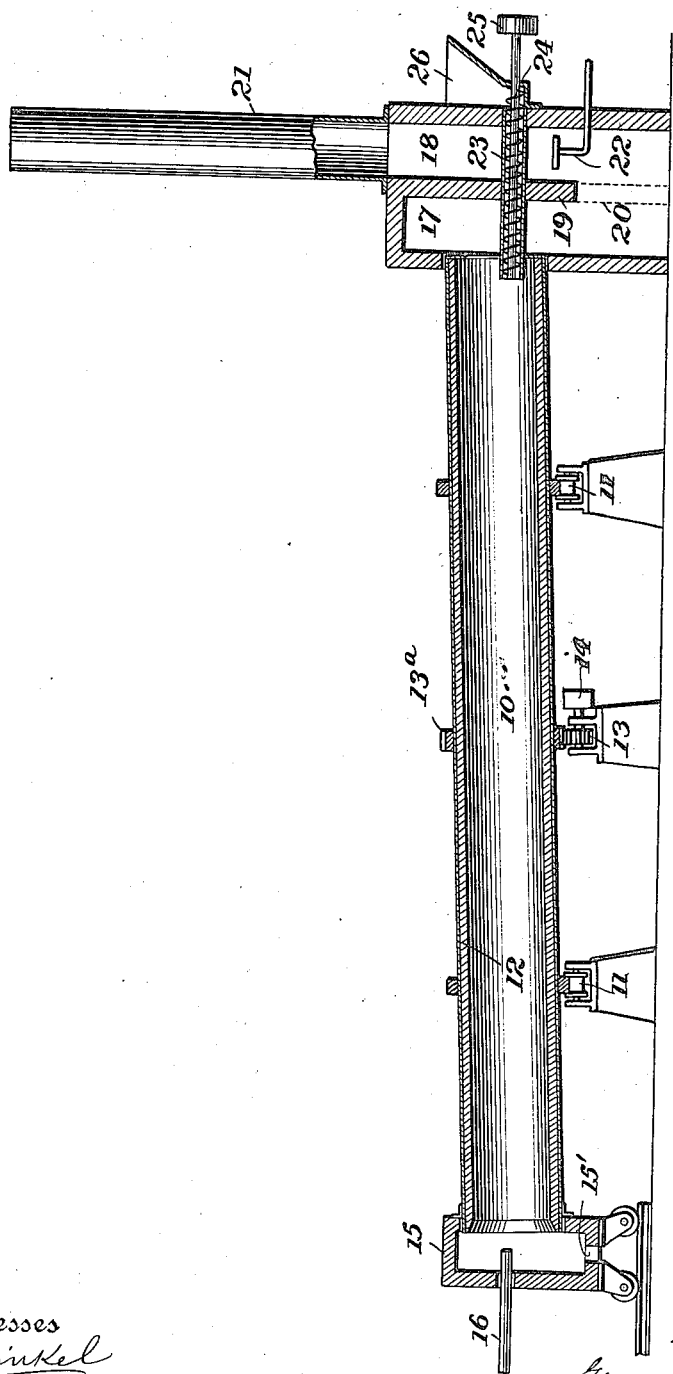

UNITED STATES PATENT OFFICE.

SPENCER B. NEWBERRY, OF SANDUSKY, OHIO, AND GEORGE R. FISHBURNE, OF CHARLESTON, SOUTH CAROLINA.

PROCESS OF MAKING FERTILIZER.

1,194,219.     Specification of Letters Patent.      Patented Aug. 8, 1916.

Application filed March 30, 1910. Serial No. 552,399.

*To all whom it may concern:*

Be it known that we, SPENCER B. NEWBERRY and GEORGE R. FISHBURNE, citizens of the United States, and residents of Sandusky, county of Erie, State of Ohio, and Charleston, county of Charleston, State of South Carolina, respectively, have invented certain new and useful Improvements in Processes of Making Fertilizer, of which the following is a specification.

This invention relates to an improved process of making citrate soluble fertilizer from natural phosphate rock, of which the following is a full and exact description.

The product herein described is a citrate soluble sodium-calcium or potassium-calcium phosphate, made by calcining natural phosphate of lime mixed with a relatively small proportion of soda or potash in caustic or carbonate form, to the temperature of fusion or semi-fusion, this operation being carried out in the special apparatus described and by observing the precautions which we have found necessary to insure success.

We are aware that it has been proposed to make from apatite a citrate soluble phosphate by mixing the mineral with a relatively large proportion of alkaline carbonate (20 to 35 per cent. of sodium carbonate or 26 to 46 per cent. of potassium carbonate) and heating the mixture to a red or orange heat. This process has not so far as we can learn, been carried out in practice, probably on account of the high cost of the large addition of carbonate of soda or potash required. We have found also that this process, when applied to ordinary impure phosphate rock containing a considerable percentage of silica, is not successful, and results in the conversion of only a part of the phosphate present into citrate soluble form, while a considerable proportion of the phosphate remains in an inert and insoluble condition.

We have found that practically complete conversion to citrate soluble form, by the use of a very much smaller proportion of alkalis than that above stated, may be secured by the following combined methods: 1. Grinding the phosphate rock to fine powder. 2. Adding sodium carbonate in amount approximately equal to one-half the phosphoric acid contained. 3. Adding lime carbonate to the amount of approximately one and one-half times the silica present. 4. Calcining the mixture at a nearly white heat to the point of semi-fusion or fusion.

Another suitable alkali compound such as potassium carbonate in equivalent quantity can be used in place of sodium carbonate, but is less desirable than the latter, owing to its much higher cost, the greater quantity required, and the greater tendency of potash to be volatilized at high temperatures. The soda or potash may also be used in caustic form. The equivalent quantity of caustic soda is 38 per cent. of the phosphoric acid present in the phosphate, that is, 38 per cent. of caustic soda is equivalent to 50 per cent. of sodium carbonate. In every case the quantity of the alkali used is equivalent to an amount of sodium carbonate approximately equal to one-half of the phosphoric acid present in the phosphate. The equivalent quantities of potassium in either carbonate or caustic form can, therefore, readily be determined.

Another suitable alkaline earth-metal compound such as carbonate of magnesia, or magnesium or calcium oxid, or magnesian limestone in equivalent quantity, may be used in place of carbonate of lime, with substantially equal result.

According to the proportions stated above, natural phosphates containing 20 to 30 per cent. phosphoric acid and 2 to 10 per cent. silica will require the addition of approximately 10 to 15 per cent. sodium carbonate and 3 to 15 per cent. lime carbonate. If carbonate of lime is present in the natural phosphate it should be allowed for in estimating the amount required to be added, as a considerable excess of lime over the proportions stated is an obstacle to the attainment of the result desired.

In the process of calcining the above described mixture at nearly white heat, the material sinters together to a pasty mass, which in ordinary vertical or continuous kilns forms an almost complete barrier to the passage of the draft, thus causing irregular burning and interfering with development of the required temperature. This behavior has necessitated the devising of a special form of calcining apparatus, by which the difficulty above described is overcome.

As a practical description of the working of the process above outlined, we take ordinary phosphate of lime or phosphate rock of commerce, and reduce it to fine powder by crushing and grinding, either by dry or wet process. We prefer the wet process, as requiring less power for a given fineness of product and obviating the necessity of drying the rock before pulverizing. A convenient method of grinding is by the use of swing-hammer pulverizers followed by tube-mills; the latter can be used with either wet or dry material. The addition of soda and carbonate of lime, in the required quantity, may be made either before or after pulverizing, but it is best to grind the materials together in order to obtain as intimate a mixture as possible. The materials should be ground to such fineness that at least ninety per cent. will pass a sieve of 100 meshes to the linear inch.

The calcining furnace consists of a revolving cylinder, slightly inclined, supported upon rollers, and driven by gears from any convenient source of power at a speed of one revolution in 1 to 2 minutes. Favorable dimensions of the cylinder are: length 40 to 60 feet; diameter 5 to 7 feet, and inclination one-half inch to the foot of length, though these dimensions may be considerably varied, beyond the limits mentioned, without important disadvantage. The interior of the cylinder is lined with refractory material, preferably 6 to 8 inches thick, which may consist of ordinary firebrick, although a basic lining consisting of magnesia brick or cement clinker brick is preferable, owing to the corrosive action of the alkali used, at high temperature, on firebrick.

The construction and arrangement of the furnace is shown in the accompanying drawing, which represents a longitudinal section of the apparatus.

10 is the inclined revolving cylinder, resting on rollers 11. The drum is driven by a suitable gear 13, meshing with a toothed ring 13ª on the cylinder. The gear is driven by a pulley 14 from any source of power. The refractory lining is shown at 12. The lower end is closed by a hood 15, through which passes a horizontal or axial pipe 16 which serves to introduce pulverized coal, gas, or liquid fuel into the furnace. The furnace terminates at its upper end in a brickwork chamber, divided into two compartments 17 and 18 by the vertical wall 19, at the bottom of which is an arched opening 20 connecting the two compartments. The second compartment 18 is surmounted by a stack 21, and contains a water-spray apparatus 22, similar to a lawn sprinkler. Through the chamber passes a horizontal or inclined pipe 23 which preferably is water jacketed and through which the material to be calcined is introduced into the furnace. In case the materials are to be burned in dry form, this feed-pipe is provided with a screw conveyer 24 driven by a pulley 25. This conveyer takes the material from hopper 26 and delivers it into the furnace.

The operation of the apparatus is as follows: The mixed and ground material is dumped into hopper 26 and conveyed into the furnace through the feed pipe 23 and in its gradual descent through the revolving furnace is raised to a white heat by the combustion of the powdered, gaseous or liquid fuel supplied through the pipe 16. The descent through the furnace requires from one-half hour to one hour; the calcined product is discharged through the opening 15′ into wagons or a suitable conveyer by which it is conveyed away to be cooled and ground to powder. The products of combustion, more or less laden with dust and volatilized alkali, pass from the furnace into the chamber 17, 18, at the bottom of which much of the dust is deposited. The remainder of the dust and alkali are caught by the water-spray 22, in which the flow of water is so regulated by a valve that nearly all the water introduced is vaporized, thus cooling the gases entering the stack to such point that practically all the alkali they contain is deposited and is carried by the excess of water from the spray to the bottom of the chamber, where it is recovered and added to fresh supplies of raw material awaiting calcination. By the use of this arrangement and device practically all loss of alkali and dust are avoided. The temperature required to yield a product containing the maximum of soluble phosphoric acid is from 2500° to 2800° F., commonly known as a white heat.

At this temperature the material becomes fused or semi-fused, and by the liberation of carbonic acid gas is rendered porous and solidifies on cooling in the form of spongy, pumice-like fragments. We find that this spongy condition is accompanied by almost complete citrate solubility of the phosphoric acid contained, and that in a product of this character the phosphoric acid remaining insoluble amounts to only a trace or at most a fraction of one per cent. This favorable result can be obtained, however, only by correctly proportioning and thoroughly mixing the ingredients, approximately as stated, and by so conducting the calcination as to produce the semi-fused porous condition described. The calcined product thus obtained is very soft and easily ground. When reduced to powder, by the use of ordinary systems of grinding, of such fineness that at least 90 per cent. passes a sieve of 100 meshes to the linear inch, the product is ready for use as fertilizer or as an ingredient of commercial fertilizers.

This process is applicable not only to high-grade phosphate rock, but also, with equally advantageous effect, to types of impure and low-grade phosphate which, on account of their high proportion of iron oxid and alumina, cannot be successfully treated by the ordinary acid superphosphate process. The product of the calcination method above described contains a percentage of citrate soluble phosphoric acid which is practically equal to that of total phosphoric acid in the raw rock treated, since the weight of material added is little or no greater than the weight lost by the raw rock during calcination.

Having thus described the invention, what is claimed is:

1. The herein described process of making citrate soluble phosphate which consists in grinding phosphate rock to a powder of such a fineness that 90% thereof will pass a 100-mesh screen, calcining with a reagent to the point of fusion or semi-fusion and grinding the calcined product to powder.

2. The herein described process of making citrate soluble phosphate which consists in grinding phosphate rock to a powder of such a fineness that 90% thereof will pass a 100-mesh screen, calcining with a reagent consisting of an alkali metal compound to the point of fusion and grinding the calcined product to powder.

3. The herein described process of making citrate soluble phosphate which consists in passing an insoluble phosphate and a reagent through a revolving calcining kiln where the materials are subjected to heat, so as to cause the conversion of the insoluble phosphate into citrate soluble form, and subjecting the discharged gases to a spray.

4. In making citrate soluble phosphate, the herein described process of calcining insoluble phosphate consisting in feeding the material to a revolving kiln, passing a hot draft therethrough, and condensing the discharged gases.

5. The herein described process of making citrate soluble phosphate which consists in calcining finely ground insoluble phosphate in a revolving kiln.

6. The herein described process of making citrate soluble phosphate which consists in intimately mixing pulverized insoluble phosphate with a reagent and calcining the same in a revolving kiln.

7. The herein described process of making citrate soluble phosphate which consists in intimately mixing finely ground insoluble phosphate with a reagent consisting of an alkali metal compound and calcining the same in a revolving kiln at nearly white heat to the point of fusion or semi-fusion.

8. The herein described process of making citrate soluble phosphate which consists in intimately mixing finely ground insoluble phosphate with a relatively small amount of re-agent and calcining the same in a revolving kiln at nearly a white heat to a point of fusion or semi-fusion.

9. The herein described process of injecting an intimate mixture of finely ground insoluble phosphate and a reagent into a revolving calcining kiln thereby continually subjecting new surfaces to heat so as to cause their decomposition and the conversion of the insoluble phosphate into the citrate soluble form.

10. The herein described process of making citrate soluble phosphate which consists in intimately mixing finely ground insoluble phosphatic material with an amount of alkali equivalent to an amount of sodium carbonate approximately equal to one-half the phosphoric acid contained in the phosphatic material, adding an amount of alkaline compound equivalent to an amount of lime carbonate approximately equal to one and one-half times the silica present in the phosphatic material and calcining the mixture at a high heat to the point of fusion or partial fusion.

In testimony whereof we affix our signatures in presence of two witnesses.

SPENCER B. NEWBERRY.

Witnesses:
F. C. PRINTY,
ALLEN KUBACH.

GEORGE R. FISHBURNE.

Witnesses:
L. J. THOMSON,
A. K. McDOWELL.